United States Patent [19]

Kennedy

[11] Patent Number: 5,202,059
[45] Date of Patent: Apr. 13, 1993

[54] COATED CERAMIC FILLER MATERIALS

[75] Inventor: Christopher R. Kennedy, Newark, Del.

[73] Assignee: Lanxide Technology Company, LP, Newark, Del.

[21] Appl. No.: 61,854

[22] Filed: Jun. 12, 1987

[51] Int. Cl.$^5$ ............................ C09K 3/00; B32B 9/04
[52] U.S. Cl. .......................... 252/389.31; 252/387.41; 252/400.31; 252/400.41; 428/446
[58] Field of Search ................... 428/446; 252/389.31, 252/389.41, 400.31, 400.41

[56] References Cited

U.S. PATENT DOCUMENTS

| | | | |
|---|---|---|---|
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 12/1968 | Mao | 106/65 |
| 3,421,863 | 7/1969 | Bawa | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,426,209 | 1/1984 | Sarin et al. | 428/404 X |
| 4,491,482 | 1/1985 | Hori | 428/404 X |
| 4,567,103 | 1/1986 | Sara | 428/698 X |
| 4,593,007 | 6/1986 | Novinski | 428/404 X |
| 4,618,525 | 10/1986 | Chamberlain et al. | 428/698 X |
| 4,668,590 | 5/1987 | Yamamoto et al. | 428/699 X |

FOREIGN PATENT DOCUMENTS 0116809 8/1984 European Pat. Off. .
0155831 9/1985 European Pat. Off. .
0169067 1/1986 European Pat. Off. .

OTHER PUBLICATIONS

"Oxidation of Molten Aluminum Alloys. Reaction with Refractories"-M. Drouzy and M. Richard-Mar., 1974-Fonderie, France No. 332 pp. 121-128.
"Refractories for Aluminum Alloy Melting Furnaces'-'-B. Clavaud and V. Jost-Sep., 1980-Lillian Brassinga (from French) Jan., 1985.

Primary Examiner—Peter A. Nelson
Attorney, Agent, or Firm—Mark G. Mortenson; William E. McShane

[57] ABSTRACT

Coated ceramic filler materials comprised of ceramic particles, fibers, whiskers, etc. having at least two substantially continuous coatings thereon are provided. The coatings are selected so that the interfacial shear strength between the ceramic filler material and the first coating, between coatings, or between the outer coating and the surrounding matrix material, are not equal so as to permit debonding and pull-out when fracture occurs. The resultant, multi-coated ceramic filler materials may be employed to provide ceramic matrix composites with increased fracture toughness. The ceramic filler materials are designed to be particularly compatible with ceramic matrices formed by directed oxidation of precursor metals.

21 Claims, 2 Drawing Sheets

COATED CERAMIC FILLER MATERIALS

FIELD OF THE INVENTION

The present invention generally relates to coated ceramic filler materials having a plurality of superimposed coatings thereon. The coated materials are useful as reinforcing materials in ceramic matrix composites to provide improved mechanical properties such as fracture toughness. The present invention also relates to improved composites which incorporate these materials, and to their methods of manufacture.

BACKGROUND OF THE INVENTION

A ceramic composite is a heterogeneous material or article comprising a ceramic matrix and filler such as ceramic particles, fibers or whiskers, which are intimately combined to achieve desired properties. These composites are produced by such conventional methods as hot pressing, cold pressing and firing, hot isostatic pressing, and the like. However, these composites typically do not exhibit a sufficiently high fracture toughness to allow for use in very high stress environments such as those encountered by gas turbine engine blades.

A novel and useful method for producing self-supporting ceramic composites by the directed oxidation of a molten precursor metal is disclosed in copending and Commonly Owned U.S. patent application Ser. No. 819,397, described below in greater detail. However, the processing environment is relatively severe, and there is a need, therefore, to protect certain fillers from the strong oxidation environment. Also, certain fillers may be reduced at least partially by molten metal, and therefore, it may be desirable to protect the filler from this local reducing environment. Still further, the protective means should be conducive to the metal oxidation process, yet not degrade the properties of the resulting composite, and even more desirably provide enhancement to the properties.

It is known in the art that certain types of ceramic fillers serve as reinforcing materials for ceramic composites, and the selection or choice of fillers can influence the mechanical properties of the composite. For example, the fracture toughness of the composite can be increased by incorporating certain high strength filler materials, such as fibers or whiskers, into the ceramic matrix. When a fracture initiates in the matrix, the filler debonds from the matrix and spans the fracture, thereby resisting or impeding the progress of the fracture through the matrix. Upon the application of additional stress, the fracture propagates through the matrix, and the filler begins to fracture in a plane different from that of the matrix, pulling out of the matrix and absorbing energy in the process. Pull-out is believed to increase certain mechanical properties such as work-of-fracture by releasing the stored elastic strain energy in a controlled manner through friction generated between the material and the surrounding matrix.

Debonding and pull-out have been achieved in the prior art by applying a suitable coating to the ceramic filler material. The coating is selected so as to have a lower bonding strength with the surrounding matrix than the filler, per se, would have with the matrix. For example, a boron nitride coating on silicon carbide fibers has been found to be useful to enhance pull-out of the fibers. However, the use of boron nitride coated fibers in composites presents significant processing disadvantages. For example, the production of ceramic matrix composites containing boron nitride coated materials requires the use of reducing atmospheres since a thin layer of boron nitride readily oxidizes at temperatures above 800°–900° C. A reducing atmosphere, however, is not compatible with the directed oxidation of molten precursor metal for fabricating ceramic composites. Further, in the directed oxidation process the coating desirably is compatible with the molten metal in that the molten metal wets the coated filler under the process conditions, for otherwise the oxidation process and matrix growth may be impeded by the filler.

Also, in order to prevent or minimize filler degradation, certain limits may be imposed on the conventional fabrication processes, such as using low processing temperatures or short times at processing temperature. For example, certain fillers may react with the matrix of the composite above a certain temperature. Coatings have been utilized to overcome degradation, but as explained above, the coating can limit the choice of processing conditions. In addition, the coating must be compatible with the filler and with the ceramic matrix.

A need therefore exists to provide coated ceramic filler materials which are capable of debonding and pull-out from a surrounding ceramic matrix. A further need exists to provide coated ceramic filler materials which may be incorporated into the ceramic matrix at elevated temperatures under oxidizing conditions to provide composites exhibiting improved mechanical properties such as increased fracture toughness.

In order to meet one or more of these needs, the prior art shows filler materials bearing one or more coatings. Carbon is a useful reinforcing filler but typically is reactive with the matrix material. It therefore is well known in the art to provide the carbon fibers with a protective coating. U.S. Pat. No. 4,397,901 teaches first coating carbon fibers with carbon as by chemical vapor deposition, and then with a reaction-formed coating of a metallic carbide, oxide, or nitride. Due to a mismatch in thermal expansion between the fiber and the coating, the fiber is capable of moving relative to the coating to relieve stress. A duplex coating on carbon fibers is taught by U.S. Pat. No. 4,405,685. The coating comprises a first or inner coating of a mixture of carbon and a metal carbide and then an outer coating of a metal carbide. The outer coatings prevent degradation of the fiber due to reaction of unprotected fiber with the matrix material, and the inner coating inhibits the propagation of cracks initiated in the outer layer. U.S. Pat. No. 3,811,920, relating to metal matrix composites, discloses coated fibers as a reinforcing filler, such as boron filaments having a silicon carbide surface layer and an additional outer coating of titanium carbide. This reference teaches that the additional coating of titanium carbide improves oxidation resistance as well as provides a diffusion barrier between the filament and metal matrix.

However, the prior art fails to teach or suggest filler materials with a duplex coating for protection from and compatibility with a molten metal in an oxidizing environment during manufacture of the ceramic matrix composite by directed oxidation, and yet in the composite exhibit debonding and pull-out from the surrounding matrix.

DESCRIPTION OF COMMONLY OWNED PATENT APPLICATIONS

The coated ceramic filler materials of this invention are particularly applicable or useful in the production of ceramic composites disclosed and claimed in copending and commonly owned U.S. patent application Ser. No. 819,397, filed Jan. 17, 1986, which is a continuation-in-part of Ser. No. 697,876, filed Feb. 4, 1985 (now abandoned), both in the name of Marc S. Newkirk et al. and entitled "Composite Ceramic Articles and Methods of Making Same". This copending application discloses a novel method for producing a self-supporting ceramic composite by growing an oxidation reaction product from a precursor metal or parent metal into a permeable mass of filler.

The method of growing a ceramic product by an oxidation reaction of a parent metal is disclosed generically in copending commonly owned U.S. patent application Ser. No. 818,943, filed Jan. 15, 1986 as a continuation-in-part of Ser. No. 776,964, filed Sep. 17, 1985 (now abandoned), which is a continuation-in-part of Ser. No. 705,787, filed Feb. 26, 1985 (now abandoned), which is a continuation-in-part of Ser. No. 591,392, filed Mar. 16, 1984 (now abandoned), all in the name of Marc S. Newkirk et al. and entitled "Novel Ceramic Materials and Methods of Making the Same"; and Ser. No. 822,999, filed Jan. 27, 1986, which is a continuation-in-part of Ser. No. 776,965, filed Sep. 17, 1985 (now abandoned), which is a continuation-in-part of Ser. No. 747,788, filed Jun. 25, 1985 (now abandoned), which is a continuation-in-part of Ser. No. 632,636, filed Jul. 20, 1984 (now abandoned), all in the name of Marc S. Newkirk et al. and entitled "Methods of Making Self-Supporting Ceramic Material".

The entire disclosures of each of the Commonly Owned Patent Applications are incorporated herein by reference.

Commonly Owned U.S. patent application Ser. No. 818,943 discloses a novel method for producing a self-supporting ceramic body by oxidation of a parent metal (as defined below) to form an oxidation reaction product which then comprises the ceramic body. More specifically, the parent metal is heated to an elevated temperature above its melting point but below the melting point of the oxidation reaction product in order to form a body of molten parent metal which reacts upon contact with a vapor-phase oxidant to form an oxidation reaction product. The oxidation reaction product, or at least a portion thereof which is in contact with and extends between the body of molten parent metal and the oxidant, is maintained at the elevated temperature, and molten metal is drawn through the polycrystalline oxidation reaction product and towards the oxidant, and the transported molten metal forms oxidation reaction product upon contact with the oxidant. As the process continues, additional metal is transported through the polycrystalline oxidation reaction product formation thereby continually "growing" a ceramic structure of interconnected crystallites. Usually, the resulting ceramic body will contain therein inclusions of nonoxidized constituents of the parent metal drawn through the polycrystalline material and solidified therein as the ceramic body cooled after termination of the growth process. As explained in these commonly owned patent applications, resultant novel ceramic materials are produced by the oxidation reaction between a parent metal and a vapor phase oxidant, i.e., a vaporized or normally gaseous material, which provides an oxidizing atmosphere. In the case of an oxide as the oxidation reaction product, oxygen or gas mixtures containing oxygen (including air) are suitable oxidants, with air usually being preferred for obvious reasons of economy. However, oxidation is used in its broad sense in the commonly owned patent applications and in this application, and refers to the loss or sharing of electrons by a metal to an oxidant which may be one or more elements and/or compounds. Accordingly, elements other than oxygen may serve as the oxidant. In certain cases, the parent metal may require the presence of one or more dopants in order to favorably influence or facilitate growth of the ceramic body, and the dopants are provided as alloying constituents of the parent metal. For example, in the case of aluminum as the parent metal and air as the oxidant, dopants such as magnesium and silicon, to name but two of a larger class of dopant materials, are alloyed with the aluminum alloy utilized as the parent metal.

The aforesaid commonly owned patent application Ser. No. 822,999 discloses a further development based on the discovery that appropriate growth conditions as described above, for parent metals requiring dopants, can be induced by externally applying one or more dopant materials to the surface or surfaces of the parent metal, thus avoiding the necessity of alloying the parent metal with dopant materials, e.g. metals such as magnesium, zinc and silicon, in the case where aluminum is the parent metal and air is the oxidant. External application of a layer of dopant material permits locally inducing metal transport through the oxidation reaction product and resulting ceramic growth from the parent metal surface or portions thereof which are selectively doped. This discovery offers a number of advantages, including the advantage that ceramic growth can be achieved in one or more selected areas of the parent metal's surface rather than indiscriminately, thereby making the process more efficiently applied, for example, to the growth of the ceramic plates by doping only one surface or only portions of a surface of a parent metal plate. This improvement invention also offers the advantage of being able to cause or promote oxidation reaction product growth in parent metals without the necessity of alloying the dopant material into the parent metal, thereby rendering the process feasible, for example, for application to commercially available metals and alloys which otherwise would not contain or have appropriately doped compositions.

Thus, the aforesaid commonly owned patent applications describe the production of oxidation reaction products readily "grown" to desired thicknesses heretofore believed to be difficult, if not impossible, to achieve with conventional ceramic processing techniques. The underlying metal, when raised to a certain temperature region above its melting point, and in the presence of dopants (if required) is transported through its own otherwise impervious oxidation reaction product, thus exposing fresh metal to the oxidizing environment to thereby yield further oxidation reaction product. In forming a ceramic composite body, as described in the aforesaid commonly owned patent application Ser. No. 819,397, the parent metal is placed adjacent a permeable mass of filler material, and the developing oxidation reaction product infiltrates the mass of filler material in the direction and towards the oxidant and boundary of the mass. The result of this phenomenon is the progressive development of an interconnected ceramic matrix, optionally containing some nonoxidized parent metal constituents distributed throughout the growth structure, and an embedded filler.

In producing the ceramic composite, any suitable oxidant may be employed, whether solid, liquid, or gaseous, or a combination thereof. If a gas or vapor oxidant, i.e. a vapor-phase oxidant, is used the filler is permeable to the vapor-phase oxidant so that upon exposure of the bed of filler to the oxidant, the gas permeates the bed of filler to contact the molten parent metal therein. When a solid or liquid oxidant is used, it is usually dispersed through a portion of the bed of filler adjacent the parent metal or through the entire bed, typically in the form of particulates admixed with the filler or as coatings on the filler particles.

Polycrystalline bodies comprising a metal boride are produced in accordance with commonly owned patent application Ser. No. 837,448, filed Mar. 7, 1986, in the name of Marc S. Newkirk, et al., and entitled "Process for Preparing Self-Supporting Bodies and Products Made Thereby". In accordance with this invention, boron or a reducible metal boride is admixed with a suitable inert filler material, and the molten parent metal infiltrates and reacts with the boron source. This reactive infiltration process produces a boride-containing composite, and the relative amounts of reactants and process conditions may be altered or controlled to yield a polycrystalline body containing varying volume percents of ceramic, metal, reinforcing filler, and/or porosity.

SUMMARY OF THE INVENTION

In accordance with this invention, a coated ceramic filler material, adaptable for use as a reinforcing component in a ceramic matrix composite, is provided with a plurality of superimposed coatings. The filler or reinforcing material useful for this invention includes materials where the length exceeds the diameter, typically in a ratio of at least about 2:1 and more preferably at least about 3:1, and includes such filler materials as whiskers, fibers, and stable. The coating system includes a first coating in substantially continuous contact with the ceramic filler material, and one or more additional or outer coatings superimposed over the underlying coating, and in substantially continuous contact therewith. Zonal junctions are formed between the filler and first coating, between superimposed coatings, and between the outer coating and the ceramic matrix. The coatings are selected so that the interfacial shear strength of at least one of these several zones is weak relative to the other zones. As used herein and in the appended claims, a zonal junction is not limited to an interface, per se, between the surfaces but also includes regions of the coatings in proximity to the interfaces, and shear, therefore, is zonal in that it may occur at an interface or within a coating. Further, it is understood that the zonal junction between adjacent surfaces may be minimal or negligible and exhibit essentially no bonding or adhesion, or the adjacent surfaces may exhibit appreciable bonding or a strong bond. Upon the application of fracture stress to the composite, the weak zone allows for debonding of the filler before the filler fractures, and pull-out or shear of the filler upon fracture of the filler. This debonding and friction pull-out enhances certain mechanical properties of the composite, and in particular debonding improves the fracture toughness. Thus, in a duplex coating system, for example, having a first coating and a second, outer coating superimposed on the first coating, the coatings are chosen to facilitate debonding and pull-out such that junction between one of the three interfaces (i.e. the interface between the filler and the inner coating, the interface between the inner coating and the outer coating, the interface between the outer coating and the surrounding matrix, or the strength of a coating) is weak relative to the other zonal junctions and allows for debonding and pull-out.

By reason of this invention, the coated ceramic filler materials not only provide improved mechanical properties, but also the filler is protected from severe oxidizing environments and yet amenable to the processing conditions for making a composite in accordance with the Commonly Owned Patent Applications. Certain fillers are at least partially reduced by the molten metal upon contact with the filler, and the coating protects the filler against this local reducing environment. Thus, the coated fillers are adaptable for use as a reinforcing component in a ceramic matrix composite formed by the directed oxidation reaction of a molten precursor metal or parent metal with an oxidant. Accordingly, a lay-up comprising a parent metal and an adjacent mass of filler is heated in an oxidizing environment to a temperature above the melting point of the metal but below the melting point of its oxidation reaction product which reacts with the oxidant (e.g. air) to form a polycrystalline oxidation reaction product. The oxidation reaction is continued thereby growing an oxidation reaction product of increasing thickness which progressively infiltrates the permeable mass of filler material to form the composite product. As explained above, it is desirable to provide the filler material with two or more superimposed coatings so as to prolong the useful life or performance of the components and the composite. The filler material is first provided with an inner coating in substantially continuous contact with the filler material which may serve to protect the filler. An outer coating, in substantially continuous contact with the underlying coating, is preferably selected so as to be wettable by molten parent metal under the conditions of the matrix formation process and substantially nonreactive therewith, and inhibits degradation of the filler material and the first or inner coating by molten metal and/or the oxidant. Further, the interfacial shear strength of one of the zonal junctions is weak relative to the others thereby permitting debonding and pull-out of the filler material on application of stress.

The choice of parent metal and oxidant will determine the composition of the polycrystalline matrix, as explained in the commonly owned patent application. Thus a filler bearing the coating system may have admixed therewith a solid or liquid oxidant, such as boron, silica, or low melting glasses, or the oxidant may be gaseous, such as an oxygen-containing gas (e.g. air) or a nitrogen-containing gas (e.g. forming gas typically comprising, by volume, 96% nitrogen and 4% hydrogen).

The coated ceramic filler materials of the invention may be utilized in the manufacture of ceramic matrix composites that provide improved mechanical properties, especially increased fracture toughness. When so employed, the thickness of the coatings is sufficient to protect the ceramic filler material against corrosive environments such as those of molten metals. However, the coatings should not be so thick as to serve as a source of structural defects or to interfere with the function of the filler.

The ceramic matrix composites of the present invention are adaptable to finishing operations such as machining, polishing, grinding, etc. The resultant composites are intended to include, without limitation, industrial, structural, and technical ceramic bodies for applications where improved strength, toughness and wear resistance are important or beneficial.

The following terms, as used herein and in the claims, have the stated meanings as defined below:

The term "oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals (e.g. aluminum parent metal) with an oxidant such as oxygen or air, nitrogen, a halogen, sulfur, phosphorous, arsenic, carbon, boron, selenium, tellurium; compounds such as silica (as a source of oxygen), and methane, ethane, propane, acetylene, ethylene, and propylene (as a source of carbon); and mixtures such as $H_2/H_2O$ and $CO/CO_2$ which are useful in reducing the oxygen activity of the environment.

The term "oxidant" means one or more suitable electron acceptors or electron sharers and may be a solid, liquid, or gas (vapor) or some combination of these. Thus, oxygen (including air) is a suitable vapor-phase gaseous oxidant, with air being preferred for reasons of economy. Boron, boron carbide and carbon are examples of solid oxidants under this definition.

The term "parent metal" as used in the specification and appended claims refers to that metal, e.g. aluminum, which is the precursor of a polycrystalline oxidation reaction product such as alumina, and includes that metal or a relatively pure metal, a commercially available metal having impurities and/or alloying constituents therein, and an alloy in which that metal precursor is the major constituent; and when a specified metal is mentioned as the parent metal, e.g. aluminum, the metal identified should be read with this definition in mind unless indicated otherwise by the context.

The term "ceramic", as used in this specification and the appended claims, is not limited to a ceramic body in the classical sense, that is, in the sense that it consists entirely of non-metallic, inorganic materials, but rather, it refers to a body which is predominantly ceramic with respect to either composition or dominant properties, although the body may contain substantial amounts of one or more metallic constituents such as derived from the parent metal, most typically within a range of from about 1–40% by volume, but may include still more metal.

DETAILED DESCRIPTION OF THE INVENTION

Figure 1:
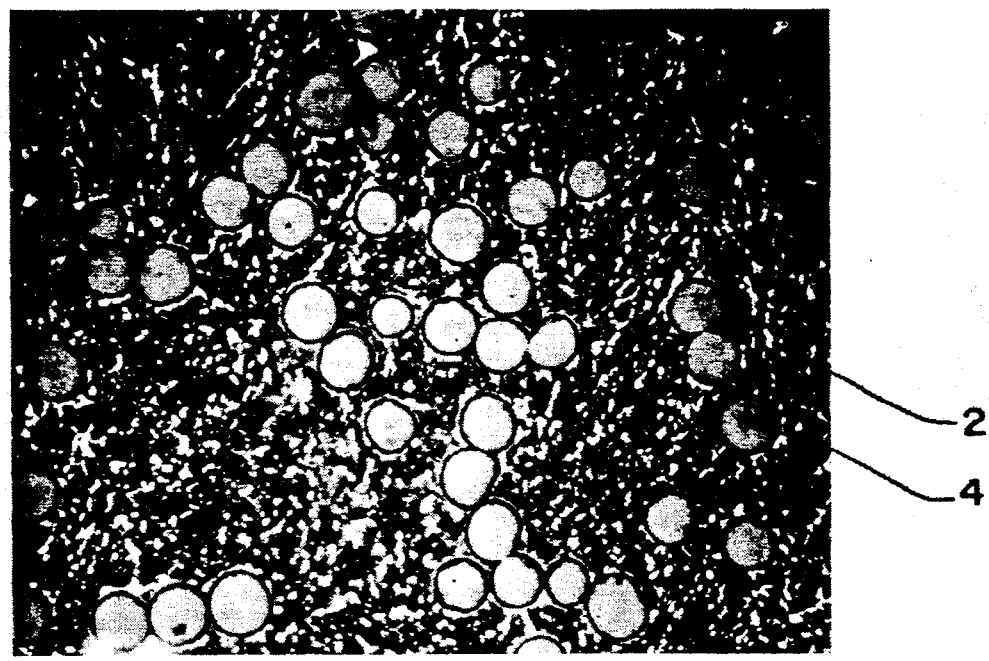
FIG. 1 is a scanning electron micrograph taken at 150× magnification of a coated ceramic filler material in a ceramic matrix and made according to the invention.

In accordance with the present invention, coated ceramic filler materials are produced by applying a plurality of superimposed coatings to the ceramic material. Suitable ceramic filler materials which may be used in the invention include metal oxides, borides, carbides, nitrides, silicides, and mixtures or combinations thereof, and may be relatively pure or contain one or more impurities or additional phases, including composites of these materials. The metal oxides include, for example, alumina, magnesia, ceria, hafnia, lanthanum oxide, neodymium oxide, samaria, praseodymium oxide, thoria, urania, yttria, and zirconia. In addition, a large number of binary, ternary, and higher order metallic compounds such as magnesium-aluminate spinel, silicon aluminum oxynitride, borosilicate glasses, and barium titanate are useful as refractory fillers. Additional ceramic filler materials may include, for example, silicon carbide, silica, boron carbide, titanium carbide, zirconium carbide, boron nitride, silicon nitride, aluminum nitride, titanium nitride, zirconium nitride, zirconium boride, titanium diboride, aluminum dodecaboride, and such materials as Si-C-O-N compounds, including composites of these materials. The ceramic filler may be in any of a number of forms, shapes or sizes depending largely on the matrix material, the geometry of the composite product, and the desired properties sought for the end product, and most typically are in the form of whiskers and fibers. The fibers can be discontinuous (in chopped form as staple) or in the form of a single continuous filament or as continuous multifilament tows. They also can be in the form of two- or three-dimensional woven continuous fiber mats or structures. Further, the ceramic mass may be homogeneous or heterogeneous.

The filler material, useful as a reinforcing or strengthening component in a ceramic matrix composite, is provided with two or more coatings. The first or inner coating is applied to the filler as a continuous film or layer, and preferably forms a bond with the filler. The second and any subsequent coatings are superimposed over an underlying coating and become attached or bonded therewith as additional layers or stratum. Each coating is applied as a substantially continuous layer, and each is in substantially continuous contact with the underlying coating or filler in the case of the first coating. The bond formed between adjacent surfaces may be weak or negligible in that there may be little or no adhesion or connection, but in the preferred embodiment there is a measurable or appreciable bonding or union between surfaces.

In a preferred embodiment of the invention, two coatings only are applied to the filler material. In such a system utilizing a duplex coating, the coatings are selected to provide adequate mismatch in bonding strengths so as to allow for debonding and pull-out upon application of stress. Also, the duplex coating is selected to provide protection against degradation of the filler, and the outer coating is selected to exhibit wettability of molten parent metal and to protect the inner coating from degradation or corrosion in high temperature, oxidizing environments under the conditions of the matrix formation process. Also, a system using two coatings rather than three or more, is advantageous from an economic standpoint.

Thus, the coatings are selected so as to be compatible with the filler material, and to the process conditions for the manufacture of the composites. Also, the coatings should complement each other in achieving the desired characteristics or properties. In a ceramic composite system having incorporated therein a filler with a duplex coating, for example, the first and outer coatings are selected to provide an adequate mismatch in interfacial shear strength so that one of the three zonal junctions is weak relative to the remaining zonal junctions to provide relative movement between the inner coating and the filler, or between coatings, or between the outer coating and the adjacent ceramic matrix. In this manner, debonding and pull-out will occur, thereby improving or enhancing the fracture toughness of the ceramic composite body.

Debonding and pull-out is especially beneficial for filler materials having a relatively high length to diameter ratio, such as fibers, typically at least about 2:1 and more particularly at least 3:1. Filler material with a low length to diameter ratio such as particles or spheres, characteristically exhibits crack deflection toughening.

In applying the coatings to the filler material, the thickness of each coating and the cumulative thickness of all coatings can vary over a wide range. This thickness can depend on such factors as the composition of each coating and their interaction, the type and geometry of the filler, and the process conditions and precursor metal used in the manufacture of the composite. Generally, the cumulative thickness for the coatings should be sufficient to completely cover the ceramic filler material and protect it from oxidation degradation, attack from molten metal, and other corrosive environments which may be encountered in employment of the finished composite. In the preferred embodiment, the inner coating is compatible with the filler material so as not to degrade its integrity, and further the inner coating can be selected to allow for debonding and pull-out or shear. The coating system is selected to be compatible with the matrix material, especially the precursor for the matrix, and further the coating system is selected so as to be capable of withstanding the process conditions used in the manufacture of the composites. While the inner coating may afford adequate protection against degradation of the filler or allow for shear between this first coating and the filler, a second or outer coating is selected to be compatible with the process conditions employed in the manufacture of the ceramic composite body, in that it should be substantially inert and not degrade, and further should exhibit wettability to molten parent metal when serving as a precursor to the ceramic matrix. Also, if the first coating or fiber is susceptible to attack and degradation by the process environment during composite manufacture or by attack of oxidants diffusing through the matrix during actual service, the second or outer coating is chosen to protect the inner coating or fiber from exposure to processing conditions and/or end use conditions. Thus, the coating system protects the fibers from degradation, as does one coating superimposed on another, and concomitantly provides for compatibility for matrix formation and use, and for relative movement to allow for shear. By reason of this coating system, structural degradation of the composite components is mitigated thereby prolonging the useful life and performance of the composite, and the fracture toughness of the composite is improved.

If the surface of the filler is very iregular and exhibits nodules, barbs, fibrils, projections, or protuberances, the filler material can mechanically interlock or bond with the adjacent surface including the adjacent coating or adjacent filler material thereby impeding or preventing debonding and pull-out, which can be deleterious to the properties of the composite. It therefore is desirable to provide a coating system which is sufficiently thick to completely cover the irregularities in the filler.

The thickness and properties of the coatings may vary depending on the deposition process and the filler material. In a duplex coating system, the thickness for each coating, in terms of the radius, typically may range from about 0.05 to about 25 microns, preferably to about 10 microns, but the innermost coating can be monoatomic in order to separate the second coating from the filler particle. The cumulative thickness for a coating system may be to about 25 microns, and more preferably 2-10 microns. Usually a coating system having a thickness within this range can be applied to the filler by conventional or known means and will provide the desired properties described above.

It has been found that a number of coating compositions can be employed in the coating system of this invention. These compositions include the metal oxides, nitrides, borides and carbides, alkaline metal salts, alkaline earth metal salts, carbon, silicon, and the like. The choice of coating compositions will depend on the filler material, the compatibility of coatings to each other, and the process conditions for the manufacture of the ceramic composite. For example, silicon carbide fibers can be used as filler in composites made according to the process described in the Commonly Owned Patent Application. In order to provide for debonding and pullout, the silicon carbide fibers may be coated with boron nitride which prevents a relatively strong bond between the coated fiber and the surrounding matrix. However, boron nitride may be degraded by the oxidation reaction conditions of the process for making the composite. Further, boron nitride may not be wet by certain metals, such as aluminum, under the conditions of the matrix formation process, and therefore as an outer coating would tend to interfere with the matrix formation. However, an inner coating exhibiting little or no wettability by parent metal under process conditions can be advantageous. For example, the coating system may have pores or flaws, but the contact angle of the molten parent metal with the inner coating may preclude transport of the parent metal through any pores or flaws in the inner coating and thereby yet protect the filler from attack by molten metal. The presence of an additional wettable outer coating on the filler would then avoid impedance to the matrix formation process. Therefore, a suitable outer coating such as silicon carbide is applied to the boron nitride coating to achieve compatibility with the forming process and to protect the boron nitride from degradation, such as by oxidation. Silicon carbide is, for example, wet by doped aluminum and relatively oxidation-resistant in an air environment at 1000° C., where boron nitride is typically not wet by aluminum, and is oxidation-prone, at these temperatures. Further, the bond between the two coatings is weak relative to the other bonds thereby facilitating debonding and pull-out of the fibers during fracture. Other useful coating compositions include, for example, titanium carbide, silicon, calcium silicate, calcium sulfate, and carbon as the inner coating, and silicon, silica, alumina, zirconia, zirconium nitride, titanium nitride, aluminum nitride, and silicon nitride as an outer coating. Other suitable compositions for the first and outer coatings may be selected for use with the ceramic filler material provided these coatings complement each other as in the manner described above.

A typical cross-sectional representation of the coated ceramic filler material is shown in FIG. 1 (discussed below in greater detail). In this typical example, the ceramic filler material comprising silicon carbide bears a first inner coating of boron nitride and an additional outer coating of silicon carbide. One or more additional outer coatings may be provided depending on the need. For example, an additional outer coating of titanium carbide may be applied to the outer coating of silicon carbide.

The first and outer coatings are deposited onto the ceramic filler material by conventional or known means such as chemical vapor deposition, plasma spraying, physical vapor deposition, plating techniques, sputtering or sol-gel processing. Achievement of a substantially uniform coating system according to these prior art techniques is within the level of skill in this art. For example, chemical vapor deposition of a uniform coating of boron nitride on ceramic filler materials can be achieved by using boron trifluoride and ammonia at a temperature of about 1000°-1500° C. and a reduced pressure of 1-100 torr; boron trichloride and ammonia at a temperature of 600°-1200° C. and reduced pressure of 1-100 torr; borazine at a temperature of 300°-650° C. and a reduced pressure of 0.1-1 torr; or diborane and ammonia at a temperature of 600°-1250° C. and a reduced pressure of 0.1-1 torr. A coating of silicon carbide by chemical vapor deposition can be accomplished, for example, by using methyltrichlorosilane at a temperature of 800°-1500° C. and a pressure of 1-760 torr; dimethyldichlorosilane at a temperature of 600°-1300° C. and a reduced pressure of 1-100 torr; and silicon tetrachloride and methane at a temperature of 900°-1400° C. and a reduced pressure of 1-100 torr.

It should be understood that various combinations of ceramic materials with first and outer coatings may be produced depending on the specific properties desired in the coated ceramic material and its ultimate application. A possible combination includes silicon carbide fiber with a first layer of titanium carbide and an additional outer layer of silicon nitride. Another coating system includes silicon carbide fiber with a first coating of boron nitride and additional outer coatings of silicon carbide and alumina.

The coated ceramic materials employed in the ceramic matrix composites of the invention are chosen so that debonding and pull-out may be achieved. Thus, the coated fibers are chosen so that the interfacial shear strength between the ceramic filler material and the first coating is sufficiently different from the interfacial shear strength between the first coating and the additional outer coating or between the outermost coating and the ceramic matrix to permit relative movement between the surfaces and allow for debonding and pull-out.

In the manufacture of ceramic matrix composites according to the invention, the coated materials may be provided in the form of a loose mass or may be laid up into a porous preform of any desired configuration. The parent metal is placed adjacent the preform. The parent metal is then heated in the presence of an oxidant to above its melting point whereby the molten metal oxidizes to form and develop an oxidation reaction product embedding the coated ceramic material. During growth of the oxidation reaction product, the molten parent metal is transported through its own otherwise impervious oxidation reaction product, thus exposing free metal to the oxidizing atmosphere to yield additional reaction product. The result of this process is the progressive growth of an interconnected ceramic oxidation reaction product which optionally may contain nonoxidized parent metal.

A variety of ceramic matrices may be produced by the oxidation reaction of parent metals depending upon the choice of parent metal and oxidant. For example, ceramic matrices may include oxides, nitrides, borides, or carbides of such parent metals as aluminum, titanium, tin, zirconium or hafnium. The ceramic matrix composites of the invention may comprise, by volume, 5 to 85% of the coated ceramic filler materials and 95 to 15% of ceramic matrix. A useful composite comprises an alumina matrix formed by the oxidation reaction of aluminum parent metal in air, or an aluminum nitride matrix by oxidation reaction (i.e., nitridation) of aluminum in nitrogen, and incorporating as a reinforcing filler such materials as alumina, silicon carbide, silicon nitride, etc., bearing the coating system. Another useful composite comprises an aluminum boride matrix formed by the reactive infiltration of a bed comprising a boron source (e.g. boron or a reducible metal boride) and a reinforcing filler bearing the coating system.

The following example illustrates certain aspects and advantages of the invention.

Two fiber-reinforced alumina-matrix ceramic composite bodies were fabricated in accordance with the present invention. The fibers employed were Nicalon ® ceramic grade silicon carbide as Si-C-O-N (from Nippon Carbon Co., Ltd., Japan) measuring approximately 2 inches long and approximately 10-20 μm in diameter. Each fiber was coated via chemical vapor deposition with a duplex coating. The duplex coating comprised a 0.2-0.5 μm thick first coating of boron nitride applied directly to the fiber, and a 1.5-2.0 μm thick second (outer) coating of silicon carbide applied to the boron nitride coating.

The duplex coated fibers were gathered into bundles, each containing 500 fibers tied with a single fiber tow. Two, 2 inch square by ⅛ inch thick bars of aluminum alloy designated 380.1 (from Belmont Metals, having a nominally identified composition by weight of 8-8.5% Si, 2-3% Zn, and 0.1% Mg as active dopants, and 3.5% Cu as well as Fe, Mn, and Ni, but the actual Mg content was sometimes higher as in the range of 0.17-0.18%) were placed into a bed of Wollastonite (a mineral calcium silicate, FP grade, from Nyco, Inc.) contained in a refractory crucible such that a 2 inch square face of each bar was exposed to the atmosphere and substantially flush with the bed, while the remainder of each bar was submerged beneath the surface of the bed. A thin layer of silica sand was dispersed over the exposed surface of each bar to serve as an additional dopant. Three of the above-described bundles of duplex-coated fibers were placed on top of each of the two sand-layered metal surfaces, and these set-ups were covered with Wollastonite.

The crucible with its contents was placed in a furnace which was supplied with oxygen at a flow rate of 500 cc/min. The furnace temperature was raised to 1000° C. at a rate of 200° C./hour, and held at 1000° C. for 54 hours.

The crucible was then removed while the furnace temperature was at 1000° C., and allowed to cool to room temperature. The ceramic composite products were recovered. Examination of the two ceramic composite products showed that an alumina ceramic matrix, resulting from oxidation of aluminum, had infiltrated and embedded the fiber bundles.

Figure 2:
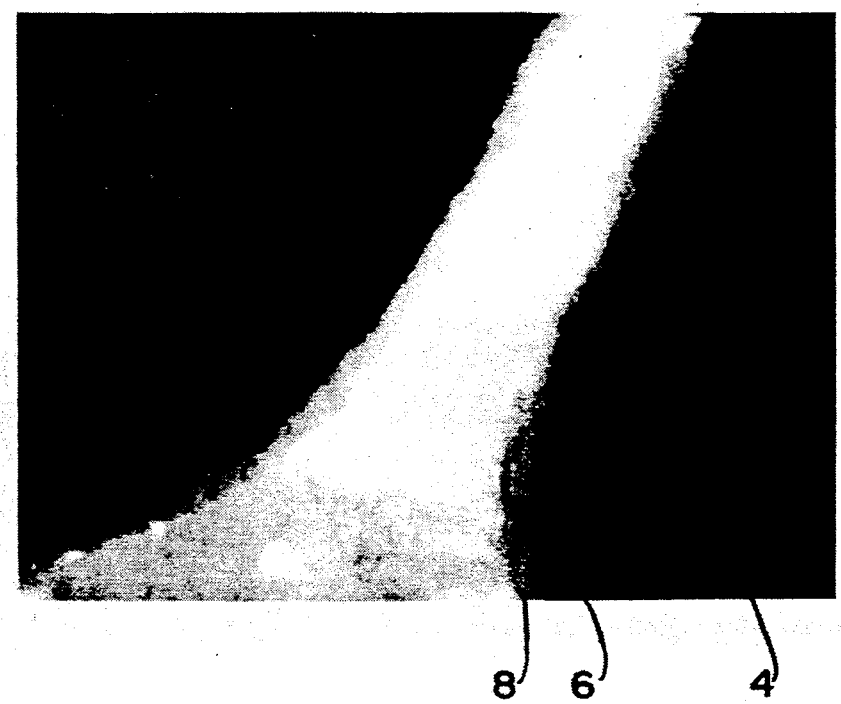
FIG. 2 is a scanning electron micrograph taken at 850× magnification of ceramic matrix composite having a coated Nicalon ® ceramic fiber as filler material and made according to the Example below.
Figure 3:
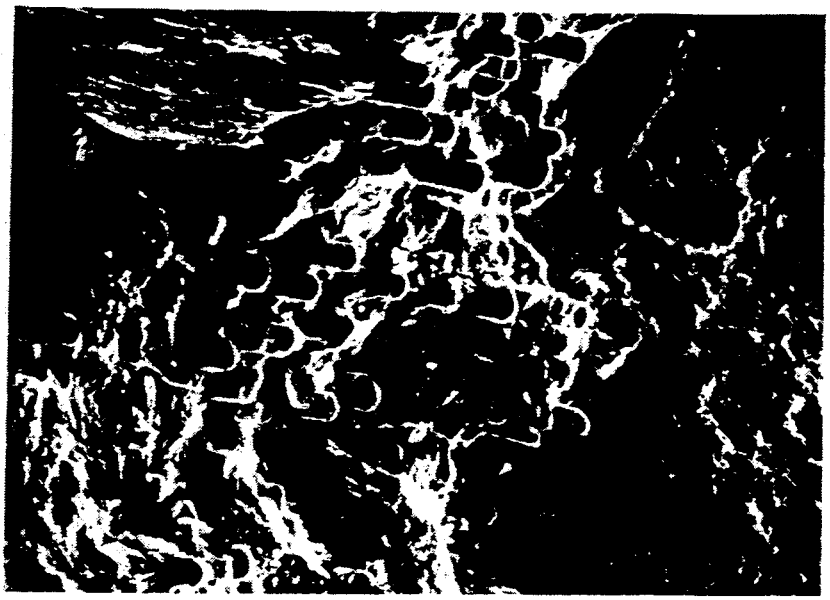
FIG. 3 is a scanning electron micrograph taken at 250× magnification of a fractured surface of the composite made with the coated fibers according to the Example below showing extensive pull-out of the fibers.

Two specimens were machined from each of the two ceramic composite products. FIGS. 1 and 2 are scanning electron micrographs at 150× magnification and 850× magnification, respectively, showing this ceramic matrix composite. Referring to the micrographs, there is shown the alumina matrix 2 incorporating silicon carbon fibers 4 bearing a first inner coating 6 of boron nitride and an outer coating 8 of silicon carbide. One machined specimen from each composite product was tested for flexural strength (Sintech strength testing machine, Model CITS 2000, from Systems Integrated Technology Inc., Stoughton, MA) in 4 point bend with a 12.67 mm upper span and a 28.55 mm lower span. The values obtained were 448 and 279 MPa. The remaining specimen from each product was tested for Chevron notch fracture toughness, and the values obtained were 19 and 17 MPam$^{\frac{1}{2}}$, respectively. FIG. 3 is a scanning electron micrograph at 250× magnification of the fractured surface of the ceramic composite showing extensive pullout of the fibers.

Figure 4:
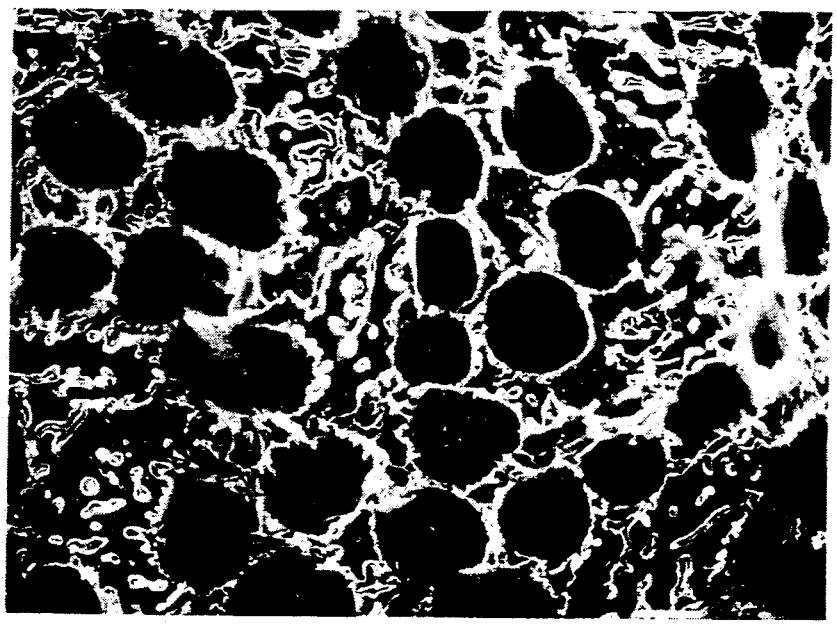
FIG. 4 is a scanning electron micrograph taken at 800× magnification of a fractured surface of the composite made with uncoated fibers according to the Example below showing no pull-out of the fibers.

This run was repeated with the exception that the Nicalon ® fibers were not coated. FIG. 4 is a scanning electron micrograph at 800× magnification of the fractured surface showing essentially no pull-out of the fibers. Typical values for strength ranged from 100–230 MPa, and for toughness ranged from 5–6 MPam$^{\frac{1}{2}}$.

The utility of coated filler material made according to the invention is clearly demonstrated by the Example and the comparative data.

What is claimed is:

1. A coated ceramic filler material adapted for use as a reinforcing component in a composite comprising a ceramic matrix formed by the directed oxidation reaction of a molten precursor metal with an oxidant and embedding said filler material, said ceramic filler material having a plurality of superimposed coatings comprising a first coating in substantially continuous contact with said filler material forming a first zonal junction between said filler material and said first coating, and an outer coating in substantially continuous contact with the underlying coating forming a second zonal junction between superimposed coatings and a third zonal junction between the outermost coating and the ceramic matrix, and the zonal shear strength of at least one of the zonal junctions being weak relative to a remainder of the other zonal junctions to permit (1) debonding of said filler material on application of stress prior to fracture of said filler material and (2) pull-out of said filler material upon fracture of said filler material.

2. The coated ceramic filler of claim 1, wherein said outermost coating is wettable by, and substantially nonreactive with, said precursor metal in forming said ceramic matrix by said directed oxidation reaction.

3. The coated ceramic filler of claim 1 or claim 2, wherein said outermost coating protects said first coating and said filler material from degradation during the formation of said ceramic matrix.

4. The coated ceramic filler material of claim 1 or claim 2, wherein the zonal junction between said ceramic filler and said first coating comprises said relatively weak zonal junction having a shear strength which permits debonding and pull-out.

5. The coated ceramic filler material of claim 1 or claim 2, wherein the zonal junction between the outer coating and the ceramic matrix comprises said relatively weak zonal junction having a shear strength which permits debonding and pull-out.

6. The coated ceramic filler material of claim 1 or claim 2, wherein the zonal junction between coatings comprises said relatively weak zonal junction having a shear strength which permits debonding and pull-out.

7. The coated ceramic filler material of claim 1 or claim 2, wherein said ceramic filler comprises a material selected from the group consisting of silicon carbide, Si-C-O-N compounds, alumina, boron carbide, mullite, zirconia, borosilicate glasses, silicon nitride, silica, titanium nitride, aluminum nitride, and boron nitride, said first coating comprises a material selected from the group consisting of boron nitride, titanium carbide, silicon, calcium silicate, calcium sulfate and carbon, and said outer coating comprises a material selected from the group consisting of silicon carbide, silicon, silica, alumina, zirconia, silicon nitride, zirconium nitride, titanium nitride, and aluminum nitride.

8. The coated filler material of claim 2, wherein said outermost coating is substantially nonreactive in an oxidizing atmosphere with molten metals selected from the group consisting of aluminum, magnesium, titanium, zirconium, tin, silicon, and alloys thereof.

9. The coated ceramic filler material of claim 1 or claim 2, wherein at least one of said coatings is sufficiently thick to substantially cover said ceramic filler material to provide a surface which is sufficiently uniform to prevent substantial mechanical bonding of said ceramic filler material with an adjacent surface.

10. The coated ceramic filler material of claim 1 or claim 2, wherein said coatings are each about 0.05 to 5 microns in thickness, and the cumulative thickness of said coatings on said ceramic filler material is no more than about 10 microns.

11. The coated ceramic filler material of claim 1 or claim 2, wherein said first coating inhibits the propagation of cracks initiated at the outer coating from reaching the ceramic filler material.

12. The coated ceramic filler material of claim 1 or claim 2, wherein said ceramic filler material has a first substantially continuous coating comprises boron nitride thereon and a second coating comprising silicon carbide superimposed over and substantially continuous with said first coating.

13. The coated ceramic filler material of claim 1 or claim 2, wherein said filler material comprising a material selected from the group consisting of whiskers, fibers or staple.

14. The coated ceramic filler material of claim 1 or claim 2, wherein said innermost coating is non-wettable by said precursor metal during the formation of said ceramic matrix.

15. The coated ceramic filler material of claim 12, wherein said ceramic filler material comprises silicon carbide or Si-C-O-N compounds.

16. A self-supporting ceramic composite comprising a ceramic matrix having a ceramic filler material incorporated therein and adapted for use as a reinforcing component in said composite, wherein said ceramic matrix is formed as the oxidation reaction product of a molten precursor metal with an oxidant and embeds said filler material, said ceramic filler material having a plurality of superimposed coatings comprising a first coating in substantially continuous contact with said filler material forming a first zonal junction between said filler material and said first coating, and an outer coating in substantially continuous contact with the underlying coating forming a second zonal junction between superimposed coatings and a third zonal junction between the outermost coating and the ceramic matrix, and the zonal shear strength of at least one of the zonal junctions being weak relative to a remainder of the other zonal junctions to (1) permit debonding of said filler material on application of stress prior to fracture of said filler material and (2) pull-out of said filler material upon fracture of said filler material.

17. The ceramic composite of claim 16, wherein said outermost coating is wettable by said molten precursor metal during formation of said ceramic matrix.

18. The ceramic composite of claim 16 or claim 17, wherein said outermost coating protects said first coating and said filler material from degradation during formation of said ceramic matrix.

19. The ceramic composite of claim 16 or claim 17, wherein the precursor metal comprises aluminum and the oxidant comprises air.

20. The ceramic composite of claim 16 or claim 17, wherein said oxidation reaction product comprises a metal boride.

21. The ceramic composite of claim 20, wherein said metal comprises aluminum.

* * * * *